US008116651B2

(12) United States Patent
Kim

(10) Patent No.: US 8,116,651 B2
(45) Date of Patent: Feb. 14, 2012

(54) PRINTING SYSTEM AND METHOD OF CHARGING TO PRINT DOCUMENT THEREIN

(75) Inventor: Duk-yong Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 677 days.

(21) Appl. No.: 12/212,229

(22) Filed: Sep. 17, 2008

(65) Prior Publication Data

US 2009/0080929 A1 Mar. 26, 2009

(30) Foreign Application Priority Data

Sep. 20, 2007 (KR) ........................ 10-2007-0096136

(51) Int. Cl.
*G03G 21/02* (2006.01)
*G03G 15/00* (2006.01)
*G06K 15/00* (2006.01)

(52) U.S. Cl. ............ 399/79; 399/80; 358/1.1; 358/1.13; 358/1.14; 358/1.15

(58) Field of Classification Search .................... 399/79, 399/80; 358/1.1, 1.13, 1.14, 1.15
See application file for complete search history.

(56) References Cited

U.S. PATENT DOCUMENTS

| | | | | |
|---|---|---|---|---|
| 7,266,598 | B2 * | 9/2007 | Rolia | 709/223 |
| 7,660,000 | B2 * | 2/2010 | Ota | 358/1.13 |
| 7,706,710 | B2 * | 4/2010 | Funahashi | 399/80 |
| 2006/0023256 | A1 * | 2/2006 | Jansen et al. | 358/1.15 |
| 2006/0188282 | A1 * | 8/2006 | Moroi | 399/80 |
| 2006/0251442 | A1 * | 11/2006 | Fuqua et al. | 399/80 |
| 2007/0091366 | A1 * | 4/2007 | McIntyre | 358/1.15 |
| 2007/0230985 | A1 * | 10/2007 | Funahashi | 399/80 |
| 2008/0181650 | A1 * | 7/2008 | Matsui | 399/80 |
| 2008/0232841 | A1 * | 9/2008 | Murakoshi | 399/80 |

FOREIGN PATENT DOCUMENTS

| | | |
|---|---|---|
| JP | 2003091471 A * | 3/2003 |
| JP | 2004-258961 | 9/2004 |
| JP | 2006-227703 | 8/2006 |

* cited by examiner

*Primary Examiner* — David Gray
*Assistant Examiner* — Francis Gray
(74) *Attorney, Agent, or Firm* — Stanzione & Kim, LLP

(57) ABSTRACT

A printing system and a method of charging to print a document therein. The printing system includes a server and a printing apparatus. The sever includes a storing part in which reference information on a document to be printed, a host communication part which receives a document including relevant information, and a host controller which charges a document registrant corresponding to the relevant information to print the document. The printing apparatus includes a printer communication part which receives the document, and a printer controller which prints the document received through the printer communication part.

19 Claims, 4 Drawing Sheets

PRINTING SYSTEM AND METHOD OF CHARGING TO PRINT DOCUMENT THEREIN

CROSS-REFERENCE TO RELATED APPLICATIONS

This application claims priority under 35 U.S.C. §119(a) from Korean Patent Application No. 10-2007-0096136, filed on Sep. 20, 2007 in the Korean Intellectual Property Office, the disclosure of which is incorporated herein in its entirety by reference.

BACKGROUND OF THE INVENTION

1. Field of the Invention

The present general inventive concept relates to a printing system which charges to print a document, and a method of charging to print therein.

2. Description of the Related Art

In general, a printing system receives a printing signal from a plurality of host apparatuses which are connected thereto on a network and prints a document. Here, charging to the document printing is typically made to a user who gives a printing command, or may be made to other people, such as a document maker.

Japanese Patent First Publication No. 2006-227703 discloses a method of charging for printing to a document maker. The document maker stores a document to be printed in a printer server, and then, a user accesses to the printer server to retrieve the concerned document and give a printing command. Here, charging for the printing is made to the document maker after identifying a registration number of the document stored in the printer server.

However, according to this conventional method, a document to be printed should be stored in a printer server to determine who is to be charged for printing, and thus, larger storing part is needed for more documents, thereby increasing expenses for the storing part.

Further, in the conventional method, a user should retrieve a document to be printed which is stored in a printer server, which causes an inconvenience to the user and requires time for retrieving the document. According to circumstances, it may be difficult for a user to retrieve a desired document.

Furthermore, the conventional method, which requires networking for document retrieving and printing command transmission, cannot be applied to the case that a user does not use a personal computer, for example, the case that a user uses a USB memory for printing.

SUMMARY OF THE INVENTION

The present general inventive concept provides a printing system which can minimize a capacity of a storing part when charging to print a document to a person other than a user who gives a printing command, and a method of charging to print therein.

The present general inventive concept also provides a printing system which can conveniently and promptly charge to print a document to a person other than a user who gives a printing command, and a method of charging to print therein.

The present general inventive concept also provides a printing system which can charge to print a document to a person other than a user who gives a printing command when printing a document through a connection means other than a network, and a method of charging to print therein.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a method of charging to print a document, the method including registering reference information, receiving a document including relevant information, printing the received document, and charging to print the document to a document registrant corresponding to the relevant information.

The relevant information may include information on the document registrant of the document.

The charging to print the document may include comparing the relevant information with the reference information.

The reference information may include at least one of a file name, a recent revision date, a file size, and a checksum.

The charging may further include requesting the document registrant approval for the charging.

The method may further include notifying a printing result to the document registrant after the document printing is completed.

The receiving the document may include logging-in with an ID and a password of a user.

The foregoing and/or other aspects and utilities of the present general inventive concept are also achieved by providing a printing system including a server having a storing part to store reference information on a document to be printed, a host communication part which receives a document including relevant information, and a host controller which charges a document registrant corresponding to the relevant information to print the document, and a printing apparatus having a printer communication part which receives the document, and a printer controller which prints the document received through the printer communication part.

The relevant information may include information on the document registrant of the document.

The host controller may compare the relevant information with the reference information.

The reference information may include at least one of a file name, a recent revision date, a file size, and a checksum.

The host controller may control the host communication part to request the document registrant approval for the charging.

The host controller may control the host communication part to notify a printing result to the document registrant after the document printing is completed.

The server may further include a user input part through which an ID and a password of a user are inputted, and the host controller performs logging-in with the inputted ID and password.

The server may be provided in the printing apparatus.

The foregoing and/or other aspects and utilities of the present general inventive concept are also achieved by providing a printing system to charge to print a document, the system including a server including a storing part to store reference information on a plurality of document registrants, a host communication part to receive a document to be printed and to transmit the document to the printing apparatus, a user input part to allow a user to request printing of the document, and a host controller to determine whether the document corresponds to one of the stored document registrants, and a printing apparatus having a printer communication part which receives the document from the host communication part, and a printer controller to print the document, wherein the host controller charges a stored document registrant when the document corresponds to one of the stored document registrants, and the host controller charges the user when the document does not correspond to one of the stored document registrants.

The document may include relevant information including document registrant information and the host controller may compare the relevant information to the stored document registrants to determine whether the document corresponds to one of the stored document registrants.

The document may include relevant information to allow the user to verify the identity of the document before requesting the printing of the document.

The foregoing and/or other aspects and utilities of the present general inventive concept are also achieved by providing a method of charging for a printing operation in a printing system, the method including storing reference information on a plurality of document registrants, receiving a document to print, the document having relevant identifying information, receiving a printing request to print the document from a user, determining whether the relevant identifying information corresponds to one of the plurality of stored document registrants, and charging a stored document registrant when the relevant identifying information corresponds to one of the stored document registrants, and charging the user when the relevant identifying information does not correspond to one of the stored document registrants.

The foregoing and/or other aspects and utilities of the present general inventive concept are also achieved by providing a computer readable recording medium having embodied thereon a computer program to execute a method, wherein the method including storing reference information on a plurality of document registrants, receiving a document to print, the document having relevant identifying information, receiving a printing request to print the document from a user, determining whether the relevant identifying information corresponds to one of the plurality of stored document registrants, and charging a stored document registrant when the relevant identifying information corresponds to one of the stored document registrants, and charging the user when the relevant identifying information does not correspond to one of the stored document registrants.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
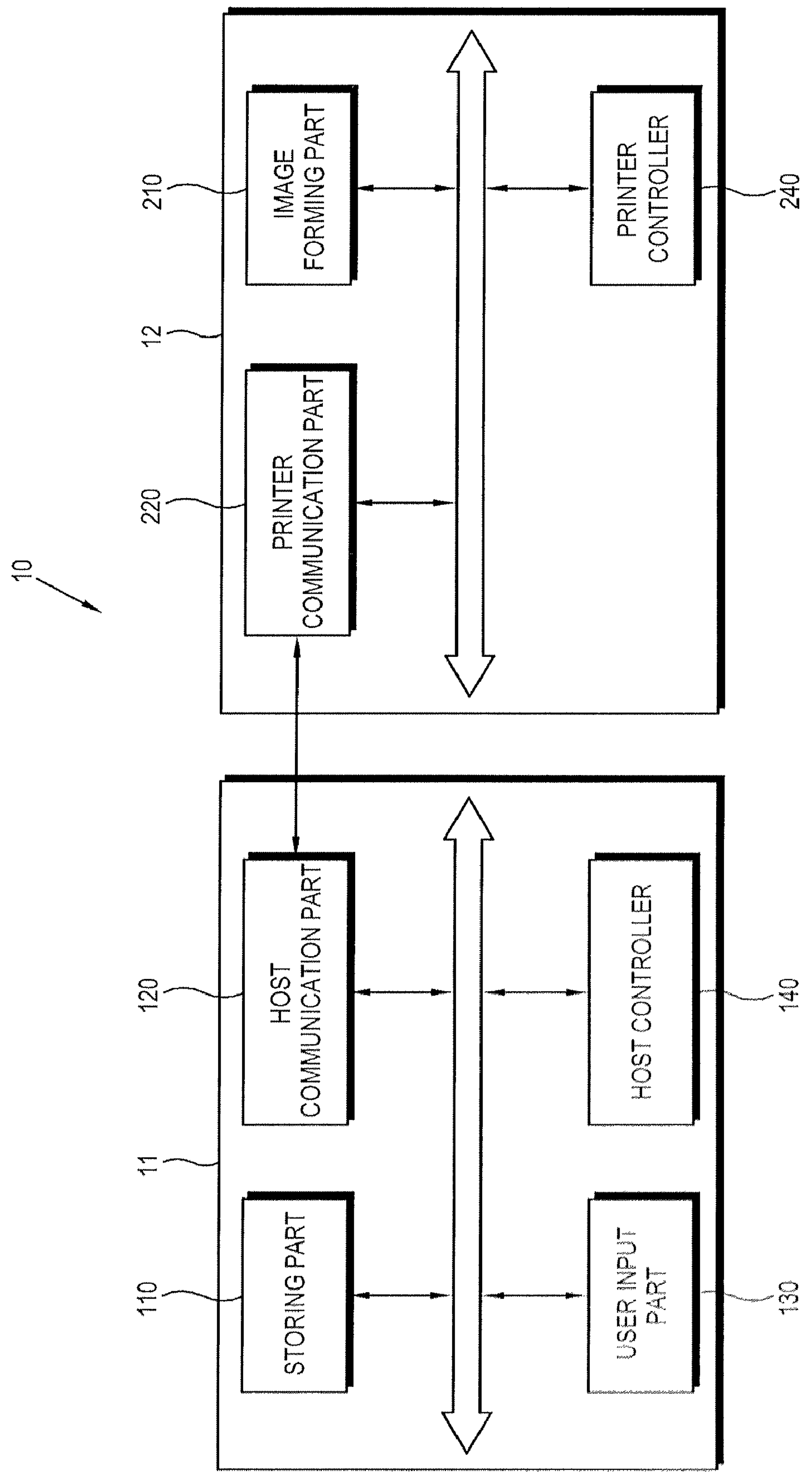
FIG. 1 is a block diagram illustrating a printing system according to an exemplary embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 2:
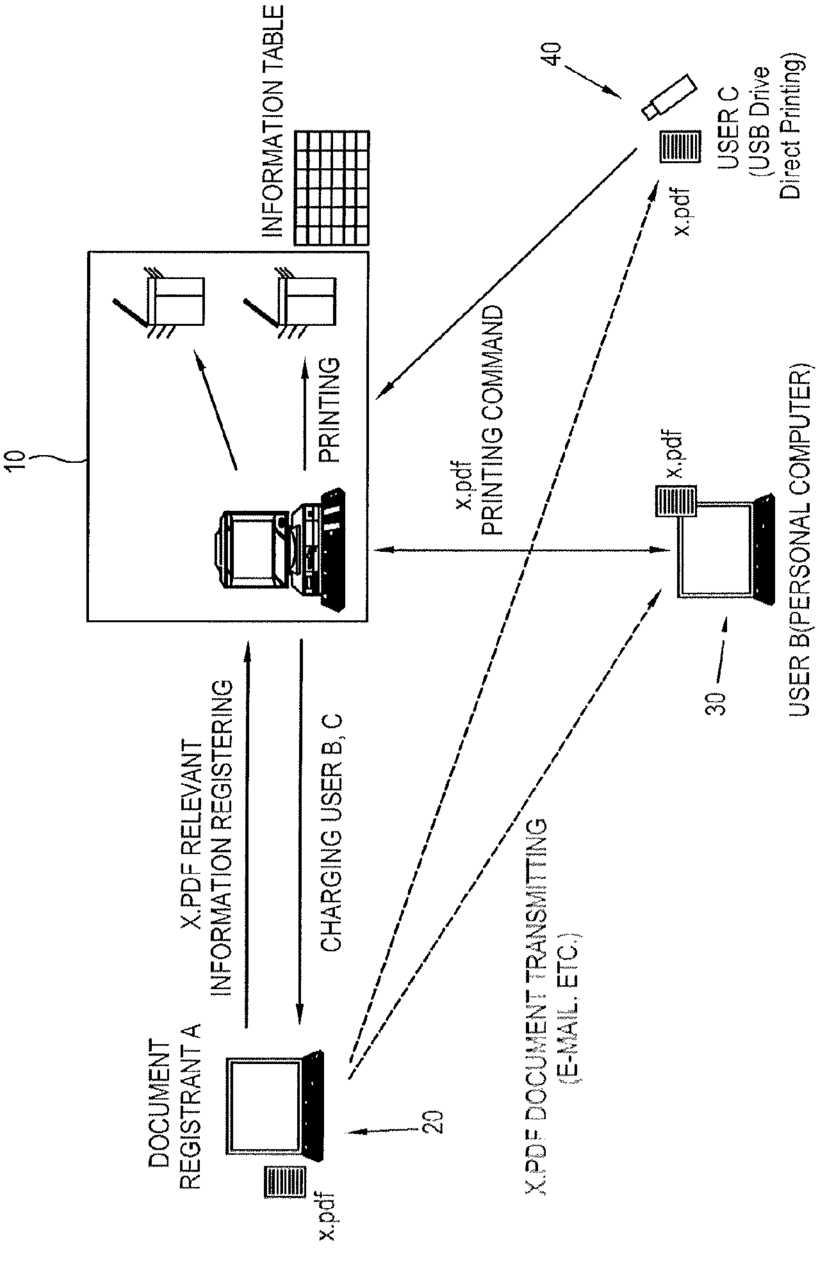
FIG. 2 illustrates processes of reference information registering, document printing, and charging to print a document in the printing system illustrated in FIG. 1.

Referring to FIGS. 1 and 2, a printing system 10 according to an exemplary embodiment of the present general inventive concept may include at least one server 11 and a printing apparatus 12. The printing apparatus 12 may be provided as a multi function device, a printer, or the like. The server 11 may be provided in the printing apparatus 12.

As illustrated in FIG. 1, the server 11 may include a storing part 110, a host communication part 120, a user input part 130, and a host controller 140.

The storing part 110 stores information on a plurality of document registrants. The document registrant refers to a person who may be charged to print a document, for example, a document maker.

The storing part 110 may further store reference information to determine whether or not a document to be printed corresponds to a user's wanted document. The reference information may include information on a document maker, a file name, a recent revision date, a file size, a checksum, etc., and may be stored in the form of an information table.

Referring to FIG. 2, the reference information may be stored in the storing part 110 by a document registrant A 20 or any other manager.

The host communication part 120 receives a document (for example, x.pdf document) which contains predetermined relevant information from a user. The user gives a printing command to the server 11, and may be embodied into a host device of the printing apparatus 12 in the present general inventive concept. In this case, the server 11 receives a document to be printed through the host communication part 120 from the user, and at the same time, receives the printing command from the user. Referring to FIG. 2, a user B 30 and a user C 40 can receive the document (for example, x.pdf document) from the document registrant A 20 through a separate route, such as an e-mail or a USB driver.

The host communication part 120 may be embodied into a wired or wireless communication module which is to be connected through a network, or into a USB port. For example, the server 11 may receive a document through a network from a personal computer of the user B 30, that is, the host device 12, or may directly receive a document through a USB driver from the user C 40.

The host communication part 120 transmits the document to the printing apparatus 12 to print.

The user input part 130 receives authority information to print the document from a user.

More particularly, a user may log-in to access the server 11 using an ID and a password. Such a log-in process may be required when the user B 30 accesses the server 11 through a network or the user C 40 directly transmits a document through a USB driver.

The user input part 130 may be provided as a control panel which is provided to the server 11 to receive an instruction from the user C 40.

The host controller 140 charges the print job to the document registrant A 20 who corresponds to the document received through the host communication part 120 among the document registrants registered in the storing part 110.

More particularly, the host controller 140 reads relevant information, such as a document registrant, a file name, a file size, a recent revision date, etc. from the received document, and compares the relevant information with the reference information stored in the storing part 110 to determine an identity of the document. Then, the host controller 140 charges the document registrant A 20 to print the document depending on the determination. The host controller 140 may re-identify the document through the checksum included in the relevant information.

The host controller 140 may charge the print job to the user B 30 or the user C 40 who gives a printing command if the reference information corresponding to the relevant information of the received document does not exist in the storing part 110.

The host controller 140 updates the charging and printing results into the information table of the storing part 110. The updated information table may be referred to by the document registrant A 20 anytime when necessary. The updated charging and printing results may be notified to a person who is to be charged through the host communication part 120, or may be displayed through a display unit (not illustrated).

The host controller 140 may request the document registrant A 20 approval to charge to print the document through the host communication part 120, and may authenticate the charging based on the approval.

On the other hand, the document registrant A 20 may establish a period of time to print the document when registering the reference information. If a printing period of time is established, the host controller 140 determines whether or not the printing period of time elapses when receiving a printing command and performs printing depending on the determination.

As illustrated in FIG. 1, the printing apparatus 12 may include an image forming part 210, a printer communication part 220, and a printer controller 240.

The image forming part 210 forms an image to print based on printing data under the control of the printer controller 240. The image forming part 210 may employ one of an ink-jet method, a laser method, and other methods known in the art.

The printer communication part 220 performs communication with the server 11.

The printer controller 240 controls the printing apparatus 12. In more detail, the printer controller 240 controls the image forming part 210 to form an image for a document received through the printer communication part 220, and controls the printer communication part 220 to transmit a printing result to the server 11 after document printing is completed.

Figure 3:
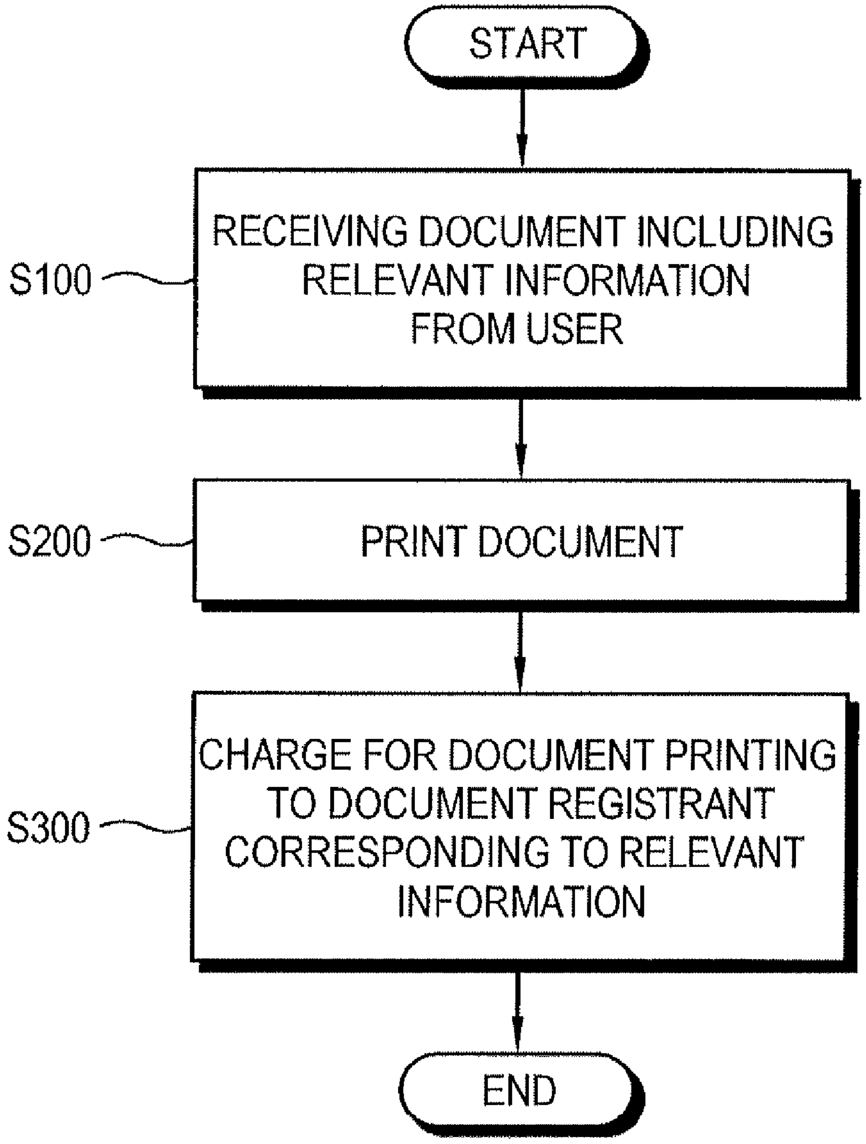
FIG. 3 is a flowchart to illustrate a method of charging to print a document according to an exemplary embodiment of the present general inventive concept.

Hereinafter, a method of charging to print a document in the printing system 10 which includes the server 11 and the printing apparatus 12, according to an exemplary embodiment of the present general inventive concept, will be described with reference to FIG. 3.

First, the server 11 receives a document including relevant information through the host communication part 120 from a user in operation S100.

Then, the printing apparatus 12 receives the document from the server 11 and prints it in operation S200.

Next, the server 11 charges a document registrant corresponding to the received document for the document printing in operation S300.

Figure 4:
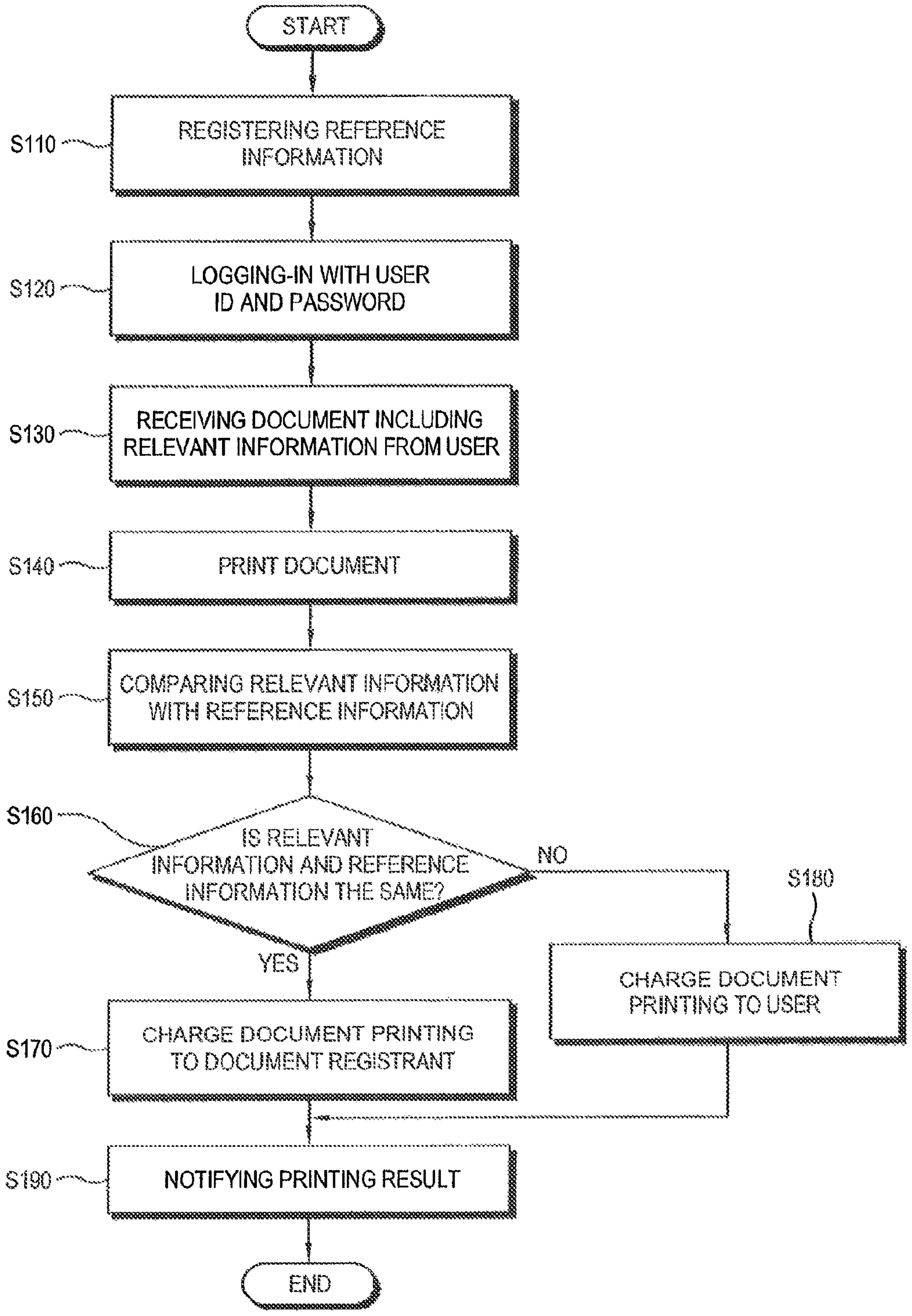
FIG. 4 is a flowchart to illustrate a method of charging to print a document according to another exemplary embodiment of the present general inventive concept.

Hereinafter, a method of charging to print a document according to another exemplary embodiment of the present general inventive concept will be described with reference to FIG. 4.

First, the server 11 registers reference information in the storing part 110 by a document registrant or any other manager in operation S110.

Then, the server 11 receives authority information, for example, an ID or a password given to a user, through the user input part 130 from the user, and determines the identity of the user in operation S120.

Next, the server 11 receives a document including relevant information from the registered user of operation S120 in operation S130. Here, the relevant information may include a document registrant, a file name, a file size, a recent revision date, a checksum, or the like.

Next, the printing apparatus 12 receives the document from the server 11 and prints it in operation S140.

The host controller 140 reads the relevant information from the document received in operation S130, and compares the relevant information with the reference information registered of operation S110 in operation S150, and determines whether or not the relevant information and the reference information are the same in operation S160.

If it is determined that the relevant information and the reference information are the same, the server 11 charges the document registrant for the document printing in operation S170. Here, the server 11 may request the document registrant approval for the charging.

If it is determined that the relevant information and the reference information are not the same, the server 11 charges a user who gives a printing command for the document printing in operation S180.

Then, the server 11 updates the printing and charging results into the storing part 110, and notifies the updated results to the charged document registrant or user in operation S190.

As described above, according to a printing system and a method of charging to print a document according to the present general inventive concept, the capacity of a storing part can be minimized when charging to print to a person other than a user who gives a printing command.

Further, it is possible to conveniently and promptly charge to print a document to a person other than a user who gives a printing command.

Furthermore, it is possible to charge to print a document to a person other than a user who gives a printing command, even when printing a document through a connection means other than a network.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few exemplary embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of charging to print a document, the method comprising:

registering reference information;

receiving a document including relevant information;

printing the received document; and charging to print the document to a document registrant corresponding to the relevant information.

2. The method according to claim 1, wherein the relevant information comprises information on the document registrant of the document.

3. The method according to claim 1, wherein the charging to print the document comprises comparing the relevant information with the reference information.

4. The method according to claim 3, wherein the reference information comprises at least one of a file name, a recent revision date, a file size, and a checksum.

5. The method according to claim 1, wherein the charging further comprises requesting the document registrant approval for the charging.

6. The method according to claim 1, further comprising:

notifying a printing result to the document registrant after the document printing is completed.

7. The method according to claim 1, wherein the receiving the document comprises logging-in with an ID and a password of a user.

8. A printing system, comprising:

a server having a storing part to store reference information on a document to be printed, a host communication part which receives a document including relevant information, and a host controller which charges a document registrant corresponding to the relevant information to print the document; and a printing apparatus having a printer communication part which receives the document, and a printer controller which prints the document received through the printer communication part.

9. The printing system according to claim 8, wherein the relevant information comprises information on the document registrant of the document.

10. The printing system according to claim 8, wherein the host controller compares the relevant information with the reference information.

11. The printing system according to claim 10, wherein the reference information comprises at least one of a file name, a recent revision date, a file size, and a checksum.

12. The printing system according to claim 8, wherein the host controller controls the host communication part to request the document registrant approval for the charging.

13. The printing system according to claim 8, wherein the host controller controls the host communication part to notify a printing result to the document registrant after the document printing is completed.

14. The printing system according to claim 8, wherein the server further comprises a user input part through which an ID and a password of a user are inputted, and the host controller performs logging-in with the inputted ID and password.

15. The printing system according to claim 8, wherein the server is provided in the printing apparatus.

16. A printing system to charge to print a document, the system comprising:

a server comprising:

a storing part to store reference information on a plurality of document registrants, a host communication part to receive a document to be printed and to transmit the document to the printing apparatus, a user input part to avow a user to request printing of the document, and a host controller to determine whether the document corresponds to one of the stored document registrants; and a printing apparatus having a printer communication part which receives the document from the host communication part, and a printer controller to print the document, wherein the host controller charges a stored document registrant when the document corresponds to one of the stored document registrants, and the host controller charges the user when the document does not correspond to one of the stored document registrants.

17. The apparatus of claim 16, wherein the document includes relevant information comprising document registrant information and the host controller compares the relevant information to the stored document registrants to determine whether the document corresponds to one of the stored document registrants.

18. The apparatus of claim 16, wherein the document includes relevant information to allow the user to verify the identity of the document before requesting the printing of the document.

19. A method of charging for a printing operation in a printing system, the method comprising:

storing reference information on a plurality of document registrants;

receiving a document to print, the document having relevant identifying information;

receiving a printing request to print the document from a user;

determining whether the relevant identifying information corresponds to one of the plurality of stored document registrants; and charging a stored document registrant when the relevant identifying information corresponds to one of the stored document registrants, and charging the user when the relevant identifying information does not correspond to one of the stored document registrants.

* * * * *